United States Patent [19]
Gohlisch et al.

[11] Patent Number: 5,378,415
[45] Date of Patent: Jan. 3, 1995

[54] PROCESS FOR THE PRODUCTION OF HOMOGENEOUS RUBBER BLANKS

[75] Inventors: Hans J. Gohlisch, Hanover; Wilfried Baumgarten, Pattensen, both of Germany

[73] Assignee: Paul Troester Maschinenfabrik, Hanover, Germany

[21] Appl. No.: 139,342

[22] Filed: Oct. 20, 1993

Related U.S. Application Data

[63] Continuation-in-part of Ser. No. 863,941, Apr. 6, 1992, abandoned.

[30] Foreign Application Priority Data

Apr. 7, 1991 [DE] Germany ............... 4111219

[51] Int. Cl.6 ............... B29C 47/50; B29C 47/56; B29C 47/76; B29C 47/92
[52] U.S. Cl. ............... 264/40.1; 264/148; 264/201; 264/211.23; 264/211.24; 366/75; 366/76; 366/77; 366/190; 425/145; 425/190; 425/202; 425/203; 425/205
[58] Field of Search ............... 264/40.1, 40.7, 148, 264/211.21, 211.23, 211.24, DIG. 65, 201; 425/145, 202, 203, 205, 207, 209, 193, 198, 199, 382.3, 190, 195, 196, 587; 366/190, 195, 196, 197, 77, 76, 75

[56] References Cited

U.S. PATENT DOCUMENTS

| | | | |
|---|---|---|---|
| 3,694,120 | 5/1972 | Walton | 425/327 |
| 3,751,527 | 8/1973 | Bortnick | 425/205 |
| 4,171,193 | 10/1979 | Rahegs | 425/145 |
| 4,227,870 | 10/1980 | Kim | 264/211.23 |
| 4,501,498 | 2/1985 | McKelvey | 425/204 |
| 4,613,471 | 5/1986 | Harris | 425/145 |
| 4,640,672 | 2/1987 | Ellwood | 425/205 |
| 4,663,103 | 5/1987 | McCullough et al. | 425/203 |
| 4,671,908 | 6/1987 | Cowinn et al. | 425/145 |
| 4,691,799 | 9/1987 | Feerling | 425/203 |
| 4,707,139 | 11/1987 | Valeuzky et al. | 425/145 |
| 4,721,589 | 1/1988 | Harris | 425/143 |
| 4,890,996 | 1/1990 | Shimizu | 264/211.23 |
| 4,902,455 | 2/1990 | Wobbe | 425/203 |
| 4,946,356 | 8/1990 | Kumazaki | 425/203 |
| 5,156,781 | 10/1992 | Bohm et al. | 264/40.1 |
| 5,179,521 | 1/1993 | Edge | 425/145 |

FOREIGN PATENT DOCUMENTS

| | | | |
|---|---|---|---|
| 3133647 | 3/1983 | Germany . | |
| 59-37217 | 9/1984 | Japan | 425/205 |
| 60-49916 | 3/1985 | Japan | 425/203 |
| 2048759 | 12/1980 | United Kingdom . | |
| 910424 | 3/1982 | U.S.S.R. | 425/145 |

*Primary Examiner*—Khanh Nguyen
*Attorney, Agent, or Firm*—Emmanuel J. Lobato

[57] ABSTRACT

Process for producing from a rubber mixture blanks for finished parts in the rubber industry is composed of an extruder having a cylinder and a screw rotatable in the cylinder to plasticize a rubber mixture fed into the cylinder, an extrusion head and a gear pump between the extruder and the extrusion head for producing extrusion pressure and forcing the mixture through the extrusion head at a predetermined rate per unit time to form a uniform strand of predetermined shape which is cut into uniform lengths.

3 Claims, 2 Drawing Sheets

PROCESS FOR THE PRODUCTION OF HOMOGENEOUS RUBBER BLANKS

This is a continuation-in-part, of application Ser. No. 07/863,941, filed Apr. 6, 1992 now abandoned.

FIELD OF THE INVENTION

The invention relates to an extruder-gear pump combination.

BACKGROUND OF THE INVENTION

Extruder-gear pump combinations of this kind are used for working with thermo-plastic synthetic resins. For many years gear pumps have been used for the production of synthetic fibers. In more recent times, extruder-gear pump combinations have been introduced in extrusion lines for the production of very thin lamina with close tolerances, for the production of single or multi-layer blown or flat foils and in cable extrusion.

Remarkably, these extruder gear pump combinations have found no use in the rubber industry. Obviously it was feared that with the rubber material, the vulcanization of portions remaining from the flow stream would cause machine damage and interruptions with the use of gear pumps. Also, in the rubber industry, the required precision for the products to be produced can far better be attained through the use of extruders in combination with calenders.

In the rubber industry, along with the production of cordage, the production of individual pieces for example, metal-rubber elements, rubber springs and similar products also plays a considerable role. Blanks for the finished parts were heretofore produced through extrusion as a continuous strand which was then cut up by a cutting device down stream of the extrusion head. The blanks thus produced do not have any precision. A higher precision can be obtained through production with a piston extruder. Such piston extruder works charge-wise with prewarmed material which is quite expensive. Also they have the disadvantage that the pressed-out blanks are not always produced as thick and homogenous as is required for precision production. For the blanks for finished parts in the rubber industry must be exact and uniform in the weight, form and thickness as is required for the end product.

SUMMARY OF THE INVENTION

The invention avoids the disadvantages of the state of the art. It is the object of the invention to provide with simple means and in a simple manner the production of rubber blanks with the required homogeneity and uniformity of thickness required for precision production.

The invention consists therein that an extruder-gear pump combination for use in apparatus for producing blanks for finished parts from a rubber mixture is provided with digital control of the gear pump drive.

Through the use of the extruder-gear pump combination in conjunction with the digital control of the drive of the gear pump it is possible to produce blanks with very high precision.

For simplicity of construction of the apparatus, it is advantageous when the extruder has only sufficient length for plasticizing the rubber mixture and the gear pump is designed to produce sufficient forward pressure for extrusion.

The precision of the parts produced can be still further improved by providing, between the extruder and the gear pump, a degassing space. It is thereby achieved that any gas inclusions in the extrudant are eliminated and a uniformed thickness of the blank is attained.

It is particularly advantageous for the precision production of the blanks when a screw with weak forwarding characteristics is combined with a gear pump having strong forwarding characteristics.

The output of the apparatus and the precision of production can be still further improved by providing a pressure/speed rotation control for the screw of the extruder, in which the pressure sensor is advantageously arranged on the inlet side of the gear pump and in particular directly ahead of the gear pump.

DESCRIPTION OF DRAWINGS

The character of the invention will be more fully understood from the following description of a preferred embodiment shown schematically in the accompanying drawings in which.

DESCRIPTION OF THE PREFERRED EMBODIMENT

Figure 1:
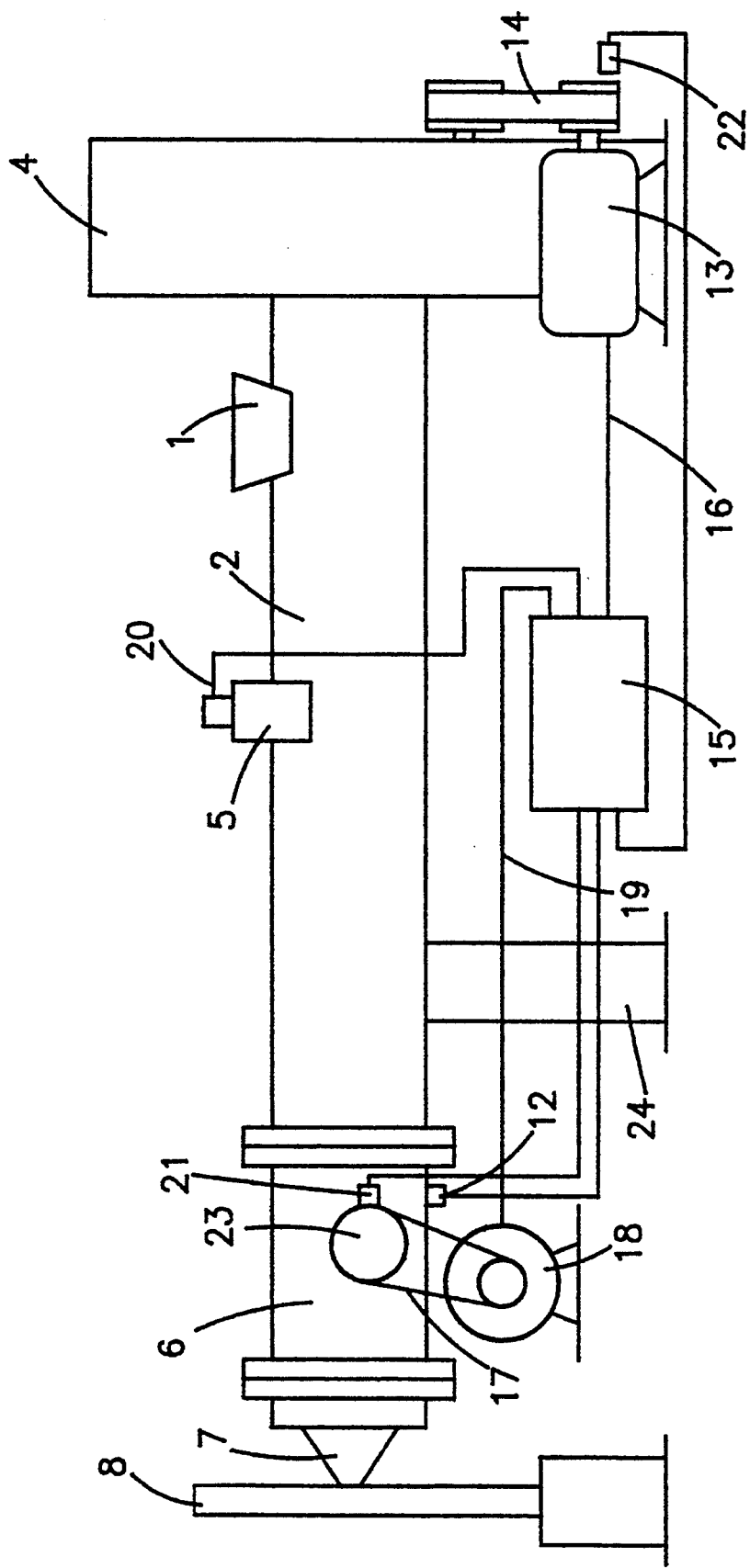
FIG. 1 is a side elevation of the apparatus.

As shown in FIG. 1, the apparatus comprises an extruder having an extruder cylinder 2 supported by a stand 24 and a gear pump 6 mounted on the discharge end of the extruder cylinder 2. The rubber mixture for forming the blanks is fed through the hopper 1 into the extruder cylinder 2 in which a screw 3 is rotated by a drive 4 and plasticizes the rubber mixture. In a plasticized state, the rubber mixture reaches the degassing unit 5 which is located in a central portion of the extruder and through which gas is drawn out of the rubber mixture. The degassing unit 5 comprises a vacuum pump, a motor driving the vacuum pump and means for controlling the speed of the vacuum pump motor connected by a line 20 with the central control unit 15. The degassed rubber mixture is then forwarded by the screw 3 to the gear pump 6. By passage through the gear pump, the conveyed rubber mass receives the necessary forward pressure to be pressed through the extrusion head 7 which produces a strand from which the blanks are cut off by the cutting device 8.

Figure 2:
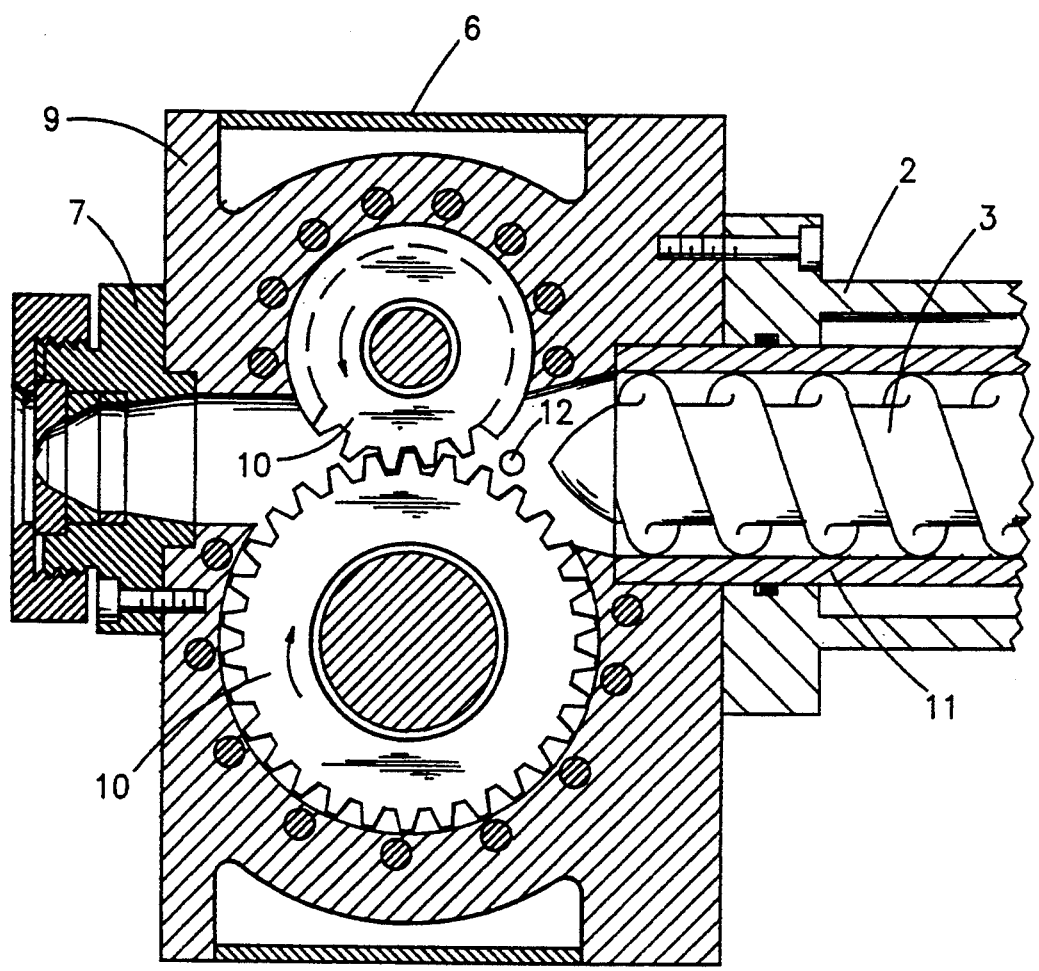
FIG. 2 is a cross section through the gear pump used.

As illustrated in FIG. 2, the gear pump 6 comprises a housing 9 having an inlet joining the discharge end of the extruder cylinder 2 and an outlet joining the extrusion head 7. In the housing 9, between the inlet and the outlet, there are two intermeshing gear wheels 10 having an inlet bight facing the inlet of the housing and a discharge bight facing the outlet of the housing. The gear wheels 10 may be of the same size or of different size as shown in FIG. 2. The cylindrical bushing 11 surrounding the screw 3 of the extruder extends into the inlet of the gear pump housing to a plane tangent to at least one of the gear wheels 10 and perpendicular to the cylindrical bushing. The screw 3 of the extruder extends beyond the end of the cylindrical bushing and into the inlet bight of the gear wheels 10 so as to deliver the platicized rubber mixture to the gear pump in a plasticized state without destroying linkages between molecules of the rubber mixture.

Power for the drive 4 of the extruder is supplied by a motor 13 through a belt or chain transmission 14. Through a belt or chain drive 17, a motor 18 drives the drive pulley 23 of the gear pump 6. The operation of the extruder 2, the vacuum pump of the degassing unit 5 and the gear pump 6 is controlled by a central control unit 15 comprising a microprocessor. Inputs of the microprocessor are connected with a pressure sensor 12 for sensing the pressure of the extrudant at the entrance to the gear pump 6, a speed sensor 21 for sensing the speed of rotation of the drive pulley 23 of the gear pump and a speed sensor 22 for sensing the speed of rotation of the motor 13 which drives the screw of the extruder. Outputs of the extruder are connected by a line 16 to the motor 13 to control the rate of rotation of the screw of the extruder, by a line 19 to the motor 18 to control the speed of rotation of the gear wheels of the gear pump 6 and by a line 20 to the vacuum pump of the degassing unit 5 to control the vacuum applied by the degassing unit. Through the microprocessor 15 the rate of rotation of the screw of the extruder is controlled at a rate sufficient to propel the rubber mixture to and out of the discharge end of the extruder cylinder but insufficient to force the rubber mixture through the extruder head 7. The microprocessor provides digital control of the gear pump drive to assure uniform extrusion of the extrudant per unit time.

What we claim is:

1. A process for the precision production of homogenous rubber blanks with apparatus comprising:

a screw extruder comprising an extruder cylinder having an inlet end portion and an outlet end, feed means in said inlet end portion of said extruder cylinder for feeding a rubber mixture into said cylinder, an extruder screw rotatable in said extruder cylinder, motor means for driving said extruder screw rotationally to propel said rubber mixture from said inlet end portion of said extruder cylinder to said outlet end and means for controlling the rate of rotation of said screw, a gear pump comprising a housing having an inlet communicating with said outlet end of said extruder cylinder and an outlet, two intermeshing gears rotatably driven in said housing and means for driving said gears rotationally to force said rubber mixture form said inlet to and out of said outlet of said housing, said gear pump having an inlet bight facing said inlet of said gear pump housing and a tip end portion of said extruder screw extruding into said inlet bight of said gears to deliver said rubber mixture into said inlet bight of said gears in a plasticized state without destroying linkages between molecules of said rubber mixture, an extrusion head disposed at said outlet of said gear pump housing for extruding said rubber mixture into a homogenous strand of uniform cross sectional shape, and cut off means disposed downstream of said extrusion head for cutting said strand into blanks of uniform length and means for driving said cut off means, said process comprising feeding a rubber mixture into said feed means of said extruder, driving said extruder screw of said extruder in rotation at a speed and torque sufficient only to plasticize said rubber mixture and to transport said rubber mixture from said feed means to said outlet end of said extruder cylinder and into said inlet of said gear pump, driving said gears of said gear pump with digital control at a precisely uniform speed to force said plasticized rubber mixture through said extrusion head in the form of a strand of uniform cross sectional shape, and driving said cut off means to cut said strand into high precision homogenous rubber blanks.

2. A process according to claim 1, further comprising measuring the pressure of said rubber mixture at said inlet of said gear pump housing and controlling the rate of rotation of said extruder screw as a function of said pressure of said rubber mixture in said inlet of said gear pump housing.

3. A process according to claim 1, further comprising the withdrawal of gases from a central portion of said extruder cylinder and precisely controlling said withdrawal of said gases.

* * * * *